United States Patent
Mildh et al.

(10) Patent No.: US 11,622,412 B2
(45) Date of Patent: Apr. 4, 2023

(54) METHOD AND DEVICE FOR UPDATING A WAIT TIMER

(71) Applicant: Telefonaktiebolaget LM Ericsson (publ), Stockholm (SE)

(72) Inventors: Gunnar Mildh, Sollentuna (SE); Icaro L. J. Da Silva, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/047,986

(22) PCT Filed: Apr. 12, 2019

(86) PCT No.: PCT/IB2019/053052
§ 371 (c)(1),
(2) Date: Oct. 15, 2020

(87) PCT Pub. No.: WO2019/202455
PCT Pub. Date: Oct. 24, 2019

(65) Prior Publication Data
US 2021/0160953 A1    May 27, 2021

Related U.S. Application Data

(60) Provisional application No. 62/657,994, filed on Apr. 16, 2018.

(51) Int. Cl.
*H04W 76/38* (2018.01)
*H04W 76/19* (2018.01)
(Continued)

(52) U.S. Cl.
CPC ......... *H04W 76/38* (2018.02); *H04W 12/106* (2021.01); *H04W 68/005* (2013.01); *H04W 76/19* (2018.02)

(58) Field of Classification Search
CPC ... H04W 76/38; H04W 76/19; H04W 12/106; H04W 68/005; H04W 36/0033;
(Continued)

(56) References Cited

U.S. PATENT DOCUMENTS 5,842,125 A * 11/1998 Modzelesky ......... H04W 12/06
455/426.1
6,058,307 A * 5/2000 Garner .................. H04W 72/10
455/12.1
(Continued)

FOREIGN PATENT DOCUMENTS

EP      2469944 A1    6/2012
JP   2012-134977 A    7/2012
(Continued)

OTHER PUBLICATIONS

Russian Office Action and English translation of the Russian Office Action dated Jun. 2, 2021 issued in corresponding Russian Application No. 2020137111, consisting of 18 pages.
(Continued)

*Primary Examiner* — Mewale A Ambaye
(74) *Attorney, Agent, or Firm* — Christopher & Weisberg, P.A.

(57) ABSTRACT

Methods and apparatuses are disclosed for updating a wait timer as a result of receiving one of a release message and a suspend message and/or configuring a wireless device (WD) to update a wait timer by determining the one of the release message and the suspend message to be communicated to the WD.

9 Claims, 7 Drawing Sheets

RRC connection resume, network release (new scenario in NR)

RRC connection resume, network suspend (new scenario in NR)

(51) Int. Cl.
*H04W 12/106* (2021.01)
*H04W 68/00* (2009.01)
(58) Field of Classification Search
CPC ..... H04W 68/00; H04W 76/30; H04W 76/18; H04W 60/005; H04W 88/08; H04W 88/02
See application file for complete search history.

(56) References Cited

U.S. PATENT DOCUMENTS

| | | | | |
|---|---|---|---|---|
| 6,226,373 | B1* | 5/2001 | Zhu | H04Q 3/0045 379/207.02 |
| 2005/0033505 | A1* | 2/2005 | Zatz | G08G 1/0962 701/117 |
| 2005/0243798 | A1* | 11/2005 | Dunn | H04L 12/2854 370/352 |
| 2006/0114882 | A1* | 6/2006 | Mills | H04W 4/14 370/352 |
| 2006/0146862 | A1* | 7/2006 | Lee | H04W 76/12 370/448 |
| 2012/0082105 | A1* | 4/2012 | Hwang | H04W 76/30 370/329 |
| 2012/0155257 | A1* | 6/2012 | Tiwari | H04W 60/005 370/230 |
| 2012/0178436 | A1* | 7/2012 | Fan | H04W 76/18 455/422.1 |
| 2012/0287851 | A1* | 11/2012 | Lee | H04W 48/02 370/328 |
| 2013/0042011 | A1* | 2/2013 | Sugizaki | H04W 28/0215 709/227 |
| 2013/0279330 | A1* | 10/2013 | Feng | H04W 48/06 370/230 |
| 2014/0301344 | A1* | 10/2014 | Lee | H04W 74/0833 370/329 |
| 2014/0321263 | A1 | 10/2014 | Wu | |
| 2021/0307100 | A1* | 9/2021 | Talebi Fard | H04W 76/30 |

FOREIGN PATENT DOCUMENTS

| | | | | |
|---|---|---|---|---|
| JP | 2013-539310 | A | 10/2013 | |
| RU | 2597490 | C2 | 9/2016 | |
| WO | WO-2013073809 | A1 * | 5/2013 | ........ H04W 74/0833 |

OTHER PUBLICATIONS

3GPP TS 23.122 V15.2.0 (Feb. 2017) 3rd Generation Partnership Project; Technical Specification Group Core Network and Terminals; Non-Access-Stratum (NAS) Functions Related to Mobile Station (MS) in Idle Mode (Release 15), consisting of 54 pages.
3GPP TS 23.401 V15.2.0 (Dec. 2017) 3rd Generation Partnership Project; Technical Specification Group Services and System Aspects; General Packet Radio Service (GPRS) Enhancements for Evolved Universal Terrestrial Radio Access Network (E-UTRAN) Access (Release 15), consisting of 404 pages.
3GPP TS 24.301 V15.1.1 (Jan. 2018) 3rd Generation Partnership Project; Technical Specification Group Core Network and Terminals; Non-Access-Stratum (NAS) Protocol for Evolved Packet System (EPS); Stage 3 (Release 15), consisting of 507 pages.
3GPP TS 33.401 V15.2.0 (Jan. 2018) 3rd Generation Partnership Project; Technical Specification Group Services and System Aspects; 3GPP System Architecture Evolution (SAE); Security Architecture (Release 15), consisting of 163 pages.
3GPP TS 36.321 V14.5.0 (Dec. 2017) 3rd Generation Partnership Project; Technical Specification Group Radio Access Network; Evolved Universal Terrestrial Radio Access (E-UTRA); Medium Access Control (MAC) Protocol Specification (Release 14), consisting of 109 pages.
3GPP TS 36.331 V15.0.1 (Jan. 2018) 3rd Generation Partnership Project; Technical Specification Group Radio Access Network; Evolved Universal Terrestrial Radio Access (E-UTRA); Radio Resource Control (RRC); Protocol Specification (Release 15), consisting of 776 pages.
3GPP TS 38.304 V0.1.2 (Feb. 2018) 3rd Generation Partnership Project; Technical Specification Group Radio Access Network; NR; User Equipment (UE) Procedures in Idle Mode and RRC Inactive State (Release 15), consisting of 21 pages.
3GPP TS 38.331 V15.0.0 (Dec. 2017) 3rd Generation Partnership Project; Technical Specification Group Radio Access Network NR Radio Resource Control (RRC) Protocol Specification (Release 15), consisting of 188 pages.
3GPP TSG-RAN WG2 #101; Tdoc R2-1802361 (Resubmission of R2-1800419); Agenda Item: 10.4.1.3.3; Source: Ericsson; Title: NR RRC States Overview and Remaining Open Issues; Document for: Discussion; Athens, Greece, Feb. 26-Mar. 2, 2018, consisting of 15 pages.
3GPP TSG-RAN WG2 Meeting #63; R2-084722; Agenda Item: 5.3.4; Source: Qualcomm Europe; Title: Integrity Protection Failure in Downlink; Document for: Discussion and Decision; Jeju, Korea, Aug. 18-22, 2008, consisting of 2 pages.
International Search Report and Written Opinion dated Sep. 3, 2019 issued in PCT Application No. PCT/IB2019/053052, consisting of 16 pages.
International Preliminary Report on Patentability dated Oct. 20, 2020 issued in PCT Application No. PCT/IB2019/053052, consisting of 9 pages.
Japanese Office Action and English Summary of the Japanese Office Action dated Feb. 7, 2022 issued in corresponding Japanese Application No. 2020-555031, consisting of 8 pages.

\* cited by examiner

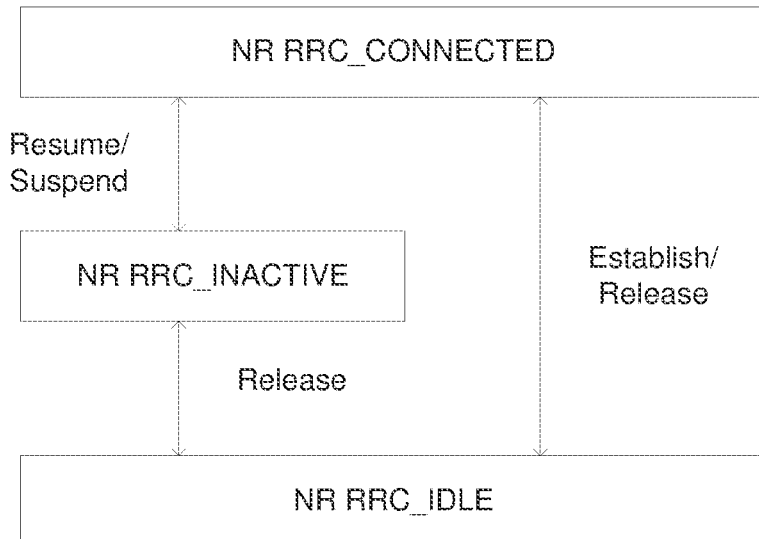
FIG. 1 - PRIOR ART
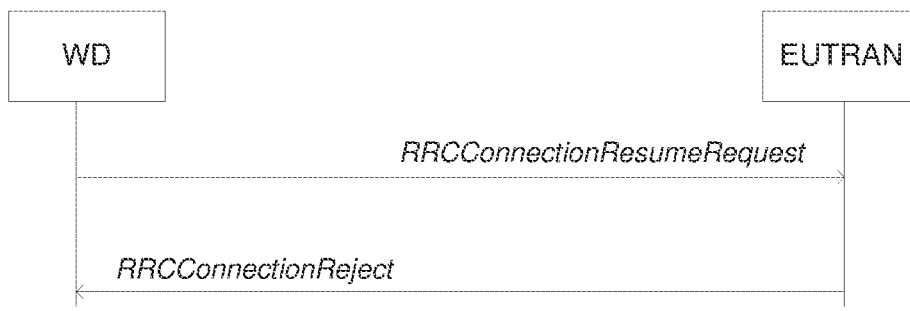
FIG. 2 - PRIOR ART
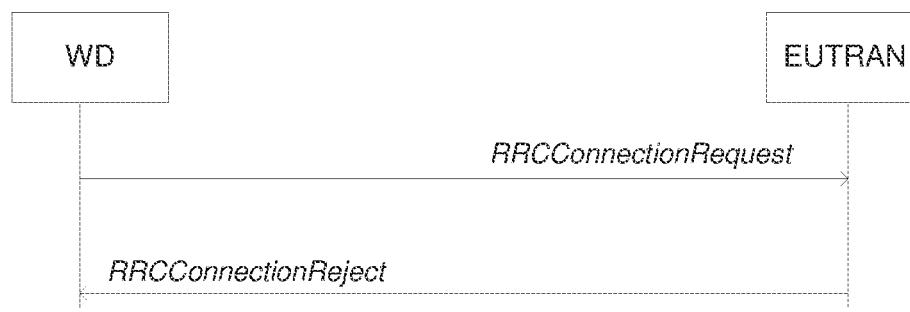
FIG. 3 - PRIOR ART

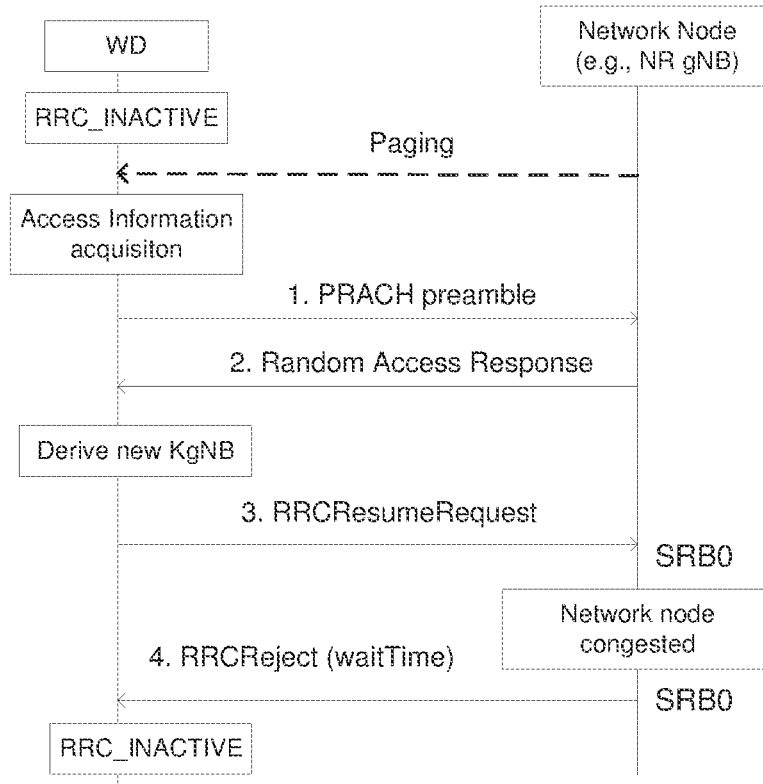
FIG. 4 - PRIOR ART
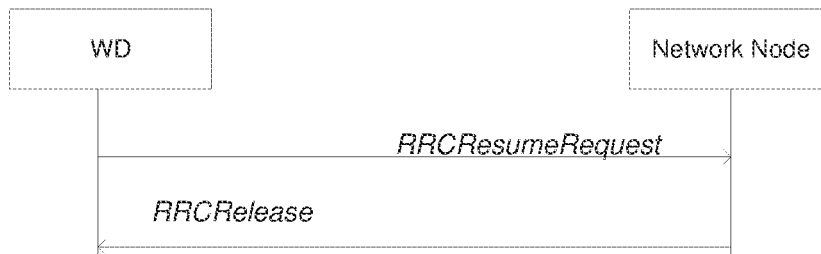
*RRC connection resume, network release (new scenario in NR)*
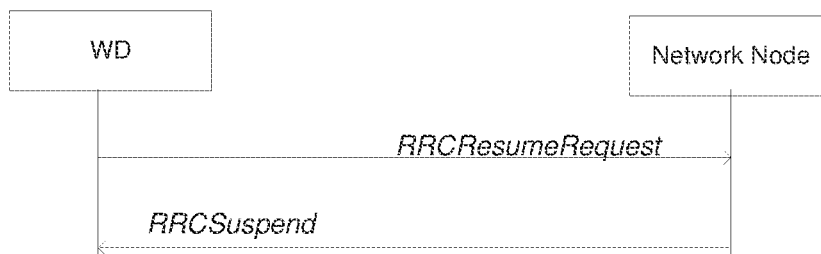
*RRC connection resume, network suspend (new scenario in NR)*
FIG. 5

METHOD AND DEVICE FOR UPDATING A WAIT TIMER

CROSS-REFERENCE TO RELATED APPLICATIONS

This application is a Submission Under 35 U.S.C. § 371 for U.S. National Stage Patent Application of International Application No.: PCT/IB2019/053052, filed Apr. 12, 2019 entitled "HANDLING OF REJECT WAIT TIME," which claims priority to U.S. Provisional Application No. 62/657,994, filed Apr. 16, 2018, entitled "HANDLING OF REJECT WAIT TIME," the entireties of both of which are incorporated herein by reference.

TECHNICAL FIELD

The present disclosure relates to wireless communications, and in particular, to apparatuses and methods for handling a reject waiting time.

BACKGROUND

Example Radio Resource Control (RRC) Connection Resume in Long-Term Evolution (LTE)

In $3^{rd}$ Generation Partnership Project (3GPP) LTE Release 13 (Rel-13), a mechanism was introduced for a wireless device (WD) (e.g., user equipment (UE)) to be suspended by the network in a suspended state similar to RRC_IDLE but with the difference that the WD stores the Access Stratum (AS) context or RRC context. This makes it possible to reduce the signaling when the WD is becoming active again by resuming the RRC connection, instead of establishing the RRC connection from scratch. Reducing the signaling could have several benefits, such as, reducing latency e.g., for smart phones accessing Internet and/or reduced signaling leading to reduced battery consumption for machine-type devices sending very little data.

Such Rel-13 solution is based on the WD sending a RRCConnectionResumeRequest message to the network and, in response, the WD receiving an RRCConnectionResume message from the network. The RRCConnectionResume may not be encrypted but integrity may be protected.

RRC_INACTIVE in NR and Possibly in LTE Rel-15

As part of the standardized work on 5G New Radio (NR) in 3GPP, it has been considered that NR should support an RRC_INACTIVE state with similar properties as the suspended state in LTE Rel-13. The RRC_INACTIVE has slightly different properties from the later state in that it is a separate RRC state and not part of RRC_IDLE as in LTE. Additionally, the CN/RAN connection (NG or N2 interface) may be kept for RRC_INACTIVE while it was suspended in LTE. FIG. 1 shows an example of possible state transitions in NR.

Some of the properties of the states shown in FIG. 1 may be as follows:

RRC_IDLE:
A WD-specific Discontinuous Reception (DRX) may be configured by upper layers;
WD-controlled mobility based on network configuration;
The WD:
  Monitors a Paging channel for Core Network (CN) paging using 5G-SAE-Temporary Mobile Subscriber Identity (S-TMSI);
  Performs neighboring cell measurements and cell (re-) selection; and
  Acquires system information.

RRC_INACTIVE:
A WD-specific DRX may be configured by upper layers or by RRC layer;
WD-controlled mobility based on network configuration;
The WD stores the AS context;
The WD:
  Monitors a Paging channel for CN paging using 5G-S-TMSI and Radio Access Network (RAN) paging using Information-Radio Network Temporary Identifier (I-RNTI);
  Performs neighboring cell measurements and cell (re-) selection;
  Performs RAN-based notification area updates periodically and when moving outside the RAN-based notification area; and Acquires system information.

RRC_CONNECTED:
The WD stores the AS context;
Transfer of unicast data to/from WD;
At lower layers, the WD may be configured with a WD-specific DRX;
For WDs supporting Carrier Aggregation (CA), use of one or more Secondary Cells (Scells), aggregated with the Primary Serving Cell (SpCell), for increased bandwidth;
For WDs supporting Dual Connectivity (DC), use of one Secondary Cell Group (SCG), aggregated with the Master Cell Group (MCG), for increased bandwidth;
Network controlled mobility, i.e. handover within NR and to/from Evolved-Universal Terrestrial Radio Access (E-UTRAN); and
The WD:
  Monitors a Paging channel;
  Monitors control channels associated with the shared data channel to determine if data is scheduled for it;
  Provides channel quality and feedback information;
  Performs neighboring cell measurements and measurement reporting; and
  Acquires system information.

Reject Procedure in LTE (Overload Scenarios)

In LTE, the network can send an RRC Reject message with a wait time either in response to an RRC Resume Request (as shown in FIG. 2), e.g., in the case of an overload condition, or in response to an RRC Connection Establishment (as shown in FIG. 3).

The Reject message may contain a wait time value and, upon receiving the message, the WD initiates a timer called T302 and informs upper layers, as shown by the following excerpt from 3GPP Technical Specification (TS) 36.331 shown as follows. According to the TS 36.331, Reception of the RRCConnectionReject by the WD may include that the WD can:
  stop timer T300;
  reset Media Access Control (MAC) and release the MAC configuration;
  except for Narrowband-Internet of Things (NB-IoT), start timer T302, with the timer value set to the waitTime;
  if the WD is a NB-IoT WD; or
  if the extended Wait Time is present and the WD supports delay tolerant access:
    forward the extended Wait Time to upper layers;
  if deprioritisationReq is included and the WD supports RRC Connection Reject with deprioritisation:
    start or restart timer T325 with the timer value set to the deprioritisationTimer signalled;
    store the deprioritisationReq until T325 expiry;

NOTE: The WD stores the deprioritisation request irrespective of any cell reselection absolute priority assignments (by dedicated or common signalling) and regardless of RRC connections in E-UTRAN or other RATs unless specified otherwise.
if the RRCConnectionReject is received in response to an RRCConnectionResumeRequest:
  if the rrc-SuspendIndication is not present:
    discard the stored WD AS context and resumeIdentity;
    inform upper layers about the failure to resume the RRC connection without suspend indication and that access barring for mobile originating calls, mobile originating signalling, mobile terminating access and except for NB-IoT for mobile originating CS fallback is applicable, upon which the procedure ends;
  else:
    suspend SRB1;
    inform upper layers about the failure to resume the RRC connection with suspend indication and that access barring for mobile originating calls, mobile originating signalling, mobile terminating access and except for NB-IoT for mobile originating CS fallback is applicable, upon which the procedure ends;
else:
  inform upper layers about the failure to establish the RRC connection and that access barring for mobile originating calls, mobile originating signalling, mobile terminating access and except for NB-IoT, for mobile originating CS fallback is applicable, upon which the procedure ends.

Another aspect about T302 that has been defined in the technical specifications is the criteria to stop the T302 timer and WD actions upon expiration of the timer. In LTE, the timer may be stopped either when the WD receives an RRCConnectionResume, or an RRCConnectionSetup, as shown below by the following excerpt from 3GPP TS 36.331.

The excerpt from 3GPP TS 36.331 is as follows:
Reception of the RRCConnectionSetup by the WD
  NOTE: Prior to this, lower layer signalling is used to allocate a C-RNTI. For further details see TS 36.321;
The WD can:
1> if the RRCConnectionSetup is received in response to an RRCConnectionResumeRequest:
  2> discard the stored WD AS context and resumeIdentity;
  2> indicate to upper layers that the RRC connection resume has been fallbacked;
1> perform the radio resource configuration procedure in accordance with the received radioResourceConfigDedicated and as specified in 5.3.10;
1> if stored, discard the cell reselection priority information provided by the idleModeMobilityControlInfo or inherited from another RAT;
1> if stored, discard the dedicated offset provided by the redirectedCarrierOffsetDedicated;
1> stop timer T300;
1> stop timer T302, if running;
1> stop timer T303, if running;
1> stop timer T305, if running;
1> stop timer T306, if running;
1> stop timer T308, if running;
1> perform the actions as specified in 5.3.3.7;
1> stop timer T320, if running;
1> stop timer T350, if running;
1> perform the actions as specified in 5.6.12.4;
1> release rclwi-Configuration, if configured, as specified in 5.6.16.2;
1> stop timer T360, if running;
1> stop timer T322, if running;
1> enter RRC_CONNECTED;
1> stop the cell re-selection procedure;
1> consider the current cell to be the PCell;
1> set the content of RRCConnectionSetupComplete message as follows:
  2> if the RRCConnectionSetup is received in response to an RRCConnectionResumeRequest:
    3> if upper layers provide an S-TMSI:
      4> set the s-TMSI to the value received from upper layers;
  2> set the selectedPLMN-Identity to the PLMN selected by upper layers (see TS 23.122, TS 24.301) from the PLMN(s) included in the plmn-IdentityList in SystemInformationBlockType1 (or SystemInformationBlockType1-NB in NB-IoT);
  2> if upper layers provide the 'Registered MME', include and set the registeredMME as follows:
    3> if the PLMN identity of the 'Registered MME' is different from the PLMN selected by the upper layers:
      4> include the plmnIdentity in the registeredMME and set it to the value of the PLMN identity in the 'Registered MME' received from upper layers;
    3> set the mmegi and the mmec to the value received from upper layers;
  2> if upper layers provided the 'Registered MME':
    3> include and set the gummei-Type to the value provided by the upper layers;
  2> if the WD supports CIoT EPS optimisation(s):
    3> include attach WithoutPDN-Connectivity if received from upper layers;
    3> include up-CIoT-EPS-Optimisation if received from upper layers;
    3> except for NB-IoT, include cp-CIoT-EPS-Optimisation if received from upper layers;
  2> if connecting as an RN:
    3> include the rn-SubframeConfigReq;
  2> set the dedicatedInfoNAS to include the information received from upper layers;
  2> except for NB-IoT:
    3> if the WD has radio link failure or handover failure information available in VarRLF-Report and if the RPLMN is included in plmn-IdentityList stored in VarRLF-Report:
      4> include rlf-InfoAvadable;
    3> if the WD has MBSFN logged measurements available for E-UTRA and if the RPLMN is included in plmn-IdentityList stored in VarLogMeasReport:
      4> include logMeasAvailableMBSFN;
    3> else if the WD has logged measurements available for E-UTRA and if the RPLMN is included in plmn-IdentityList stored in VarLogMeasReport:
      4> include logMeasAvailable;
    3> if the WD has connection establishment failure information available in VarConnEstFailReport and if the RPLMN is equal to plmnIdentity stored in VarConnEstFailReport:
      4> include connEstFailInfoAvailable;

3> include the mobilityState and set it to the mobility state (as specified in TS 36.304) of the WD just prior to entering RRC_CONNECTED state;
3> if the WD supports storage of mobility history information and the WD has mobility history information available in VarMobilityHistoryReport:
4> include the mobilityHistoryAvad;
2> include den-ID if a DCN-ID value (see TS 23.401) is received from upper layers;
2> if WD needs UL gaps during continuous uplink transmission:
3> include ue-CE-NeedULGaps;
2> submit the RRCConnectionSetupComplete message to lower layers for transmission, upon which the procedure ends;

Reception of the RRCConnectionResume by the WD
The WD can:
1> stop timer T300;
1> restore the PDCP state and re-establish PDCP entities for SRB2, if configured with E-UTRA PDCP, and for all DRBs that are configured with E-UTRA PDCP;
1> if drb-ContinueROHC is included:
2> indicate to lower layers that stored WD AS context is used and that drb-ContinueROHC is configured;
2> continue the header compression protocol context for the DRBs configured with the header compression protocol;
1> else:
2> indicate to lower layers that stored WD AS context is used;
2> reset the header compression protocol context for the DRBs configured with the header compression protocol;
1> discard the stored WD AS context and resumeIdentity;
1> perform the radio resource configuration procedure in accordance with the received radioResourceConfigDedicated and as specified in 5.3.10;
NOTE: When performing the radio resource configuration procedure, for the physical layer configuration and the MAC Main configuration, the restored RRC configuration from the stored WD AS context is used as basis for the reconfiguration.
1> if the received RRCConnectionResume message includes the sk-Counter:
2> perform key update procedure as specified in TS 38.331 [5.3.5.8];
1> if the received RRCConnectionResume message includes the nr-RadioBearerConfig1:
2> perform radio bearer configuration as specified in TS 38.331 [5.3.5.6];
1> if the received RRCConnectionResume message includes the nr-RadioBearerConfig2:
2> perform radio bearer configuration as specified in TS 38.331 [5.3.5.6];
1> resume SRB2 and all DRBs, if any, including RBs configured with NR PDCP;
1> if stored, discard the cell reselection priority information provided by the idleModeMobilityControlInfo or inherited from another RAT;
1> if stored, discard the dedicated offset provided by the redirectedCarrierOffsetDedicated;
1> if the RRCConnectionResume message includes the measConfig:
2> perform the measurement configuration procedure as specified in 5.5.2;
1> stop timer T302, if running;
1> stop timer T303, if running;
1> stop timer T305, if running;
1> stop timer T306, if running;
1> stop timer T308, if running;
1> perform the actions as specified in 5.3.3.7;
1> stop timer T320, if running;
1> stop timer T350, if running;
1> perform the actions as specified in 5.6.12.4;
1> stop timer T360, if running;
1> stop timer T322, if running;
1> update the $K_{eNB}$ key based on the $K_{ASME}$ key to which the current $K_{eNB}$ is associated, using the nextHopChainingCount value indicated in the RRCConnectionResume message, as specified in TS 33.401;
1> store the nextHopChainingCount value;
1> derive the $K_{RRCint}$ key associated with the previously configured integrity algorithm, as specified in TS 33.401;
1> request lower layers to verify the integrity protection of the RRCConnectionResume message, using the previously configured algorithm and the $K_{RRCint}$ key;
1> if the integrity protection check of the RRCConnectionResume message fails:
2> perform the actions upon leaving RRC_CONNECTED as specified in 5.3.12, with release cause 'other', upon which the procedure ends;
1> derive the $K_{RRCenc}$ key and the $K_{UPenc}$ key associated with the previously configured ciphering algorithm, as specified in TS 33.401;
1> configure lower layers to resume integrity protection using the previously configured algorithm and the $K_{RRC}c_{uat}$ key immediately, i.e., integrity protection shall be applied to all subsequent messages received and sent by the WD;
1> configure lower layers to resume ciphering and to apply the ciphering algorithm, the $K_{RRCenc}$ key and the $K_{UPenc}$ key, i.e. the ciphering configuration shall be applied to all subsequent messages received and sent by the WD;
1> enter RRC_CONNECTED;
1> indicate to upper layers that the suspended RRC connection has been resumed;
1> stop the cell re-selection procedure;
1> consider the current cell to be the PCell;
1> set the content of RRCConnectionResumeComplete message as follows:
2> set the selectedPLMN-Identity to the PLMN selected by upper layers (see TS 23.122, TS 24.301) from the PLMN(s) included in the plmn-IdentityList in SystemInformationBlockType1;
2> set the dedicatedInfoNAS to include the information received from upper layers;
2> except for NB-IoT:
3> if the WD has radio link failure or handover failure information available in VarRLF-Report and if the RPLMN is included in plmn-IdentityList stored in VarRLF-Report:
4> include rlf-InfoAvailable;
3> if the WD has MBSFN logged measurements available for E-UTRA and if the RPLMN is included in plmn-IdentityList stored in VarLogMeasReport:
4> include logMeasAvailableMBSFN;
3> else if the WD has logged measurements available for E-UTRA and if the RPLMN is included in plmn-IdentityList stored in VarLogMeasReport:
4> include logMeasAvailable;

3> if the WD has connection establishment failure information available in VarConnEstFailReport and if the RPLMN is equal to plmnIdentity stored in VarConnEstFailReport:
   4> include connEstFailInfoAvailable;
3> include the mobilityState and set it to the mobility state (as specified in TS 36.304) of the WD just prior to entering RRC_CONNECTED state;
3> if the WD supports storage of mobility history information and the WD has mobility history information available in VarMobilityHistoryReport:
   4> include mobilityHistoryAvail;
1> submit the RRCConnectionResumeComplete message to lower layers for transmission;
1> the procedure ends.

Table 1 herein below is an example of a table defined in current specifications.

TABLE 1

Section 7.3.1 Timers (Informative)

| Timer | Start | Stop | At expiry |
|---|---|---|---|
| T300 NOTE1 | Transmission of RRCConnectionRequest or RRCConnectionResumeRequest | Reception of RRCConnectionSetup, RRCConnectionReject or RRCConnectionResume message, cell re-selection and upon abortion of connection establishment by upper layers | Perform the actions as specified in 5.3.3.6 |
| T301 NOTE1 | Transmission of RRCConnectionReestabilshmentRequest | Reception of RRCConnectionReestablishment or RRCConnectionReestablishmentReject message as well as when the selected cell becomes unsuitable | Go to RRC_IDLE |
| T302 | Reception of RRCConnectionReject while performing RRC connection establishment | Upon entering RRC_CONNECTED and upon cell re-selection | Inform upper layers about barring alleviation as specified in 5.3.3.7 |

Considerations on the Reject Procedure in NR

The Reject procedure has also been discussed for NR. In RAN2#99bis, the following has been considered:

A WD in INACTIVE, trying to resume an RRC connection, can receive MSG4 sent over SRB0 (without Integrity protection) to move the WD back into INACTIVE (i.e. rejected with wait timer).

INACTIVE related parameters/configuration should not be updated by a MSG4 sent over SRB0 (as it is a non-protected message).

FIG. 4 illustrates an example of transitions from RRC_INACTIVE to RRC-INACTIVE in a rejection scenario.

Current Implementation on Reject Procedure to RRC NR Specifications. The Reject procedure is currently being considered. First, as in LTE, timer T302 may be started upon the reception of an RRCReject message, which can either be in response to an RRCResumeRequest or RRCSetupRequest, as the following excerpt of TS 38.331 shows: Reception of the RRCReject by the WD—The WD can:

1> stop timer T300;

1> reset MAC and release the MAC configuration;

1> start timer T302, with the timer value set to the waitTime;

1> inform upper layers about the failure to establish the RRC connection and access control related information, upon which the procedure ends.

The access control related information may be informed to higher layers.

SUMMARY

Some embodiments advantageously provide methods and apparatuses for handling a reject wait time or integrity errors associated with a wait timer that may advantageously e.g., avoid or reduce network inefficiencies.

According to one aspect of the present disclosure, a method in a wireless device, WD, is provided. The method comprises receiving, from a network node, one of a release message and a suspend message; and updating a wait timer as a result of receiving the one of the release message and the suspend message.

In some embodiments of this aspect, the wait timer is a T302 timer. In some embodiments of this aspect, updating the wait timer as a result of receiving the one of the release message and the suspend message further comprises: stopping the wait timer responsive to receipt of the one of the release message and the suspend message. In some embodiments of this aspect, updating the wait timer as a result of receiving the one of the release message and the suspend message further comprises: updating the wait timer according to a wait value identified in the one of the release message and the suspend message. In some embodiments of this aspect, updating the wait timer as a result of receiving the one of the release message and the suspend message further comprises: stopping the wait timer responsive to identifying an indicator within the one of the release message and the suspend message, the indicator indicating that the wait timer should be stopped if running. In some embodiments of this aspect, updating the wait timer as a result of receiving the one of the release message and the suspend message further comprises: stopping the wait timer responsive to identifying an absence of an indicator within the one of the release message and the suspend message, the indicator indicating that the wait timer should continue running if already running. In some embodiments of this aspect, updating the wait timer as a result of receiving the one of the release message and the suspend message further comprises: restarting the wait timer responsive to receipt of the one of the release message and the suspend message. In some embodiments of this aspect, the one of the release message and the suspend message is one of a Radio Resource Control, RRC, Release message and a RRC Suspend message. In some embodiments of this aspect, the method further comprises communicating, to the network node, a resume request message, wherein the one of the release message and the suspend message is received as a result of communicating the resume request message.

According to another aspect of the present disclosure, a method in a wireless device, WD, comprises detecting an integrity protection verification error in a lower layer while a wait timer is running; and updating the wait timer as a result of the detection of the integrity protection verification error.

In some embodiments of this aspect, the wait timer is a T302 timer. In some embodiments of this aspect, updating the wait timer as a result of the detection of the integrity protection verification error further comprises: stopping the wait timer responsive to the detection of the integrity protection verification error. In some embodiments of this aspect, updating the wait timer as a result of the detection of the integrity protection verification error further comprises: restarting the wait timer responsive to the detection of the integrity protection verification error. In some embodiments of this aspect, detecting the integrity protection verification error in the lower layer while the wait timer is running further comprises at least one of: detecting that a T300X timer expired and detecting an integrity check failure while the T300X timer is running.

In yet another aspect of the present disclosure, a method in a network node configured to communicate with a wireless device, WD, is provided. The method comprises receiving, from the WD, a resume request message; and determining one of a release message and a suspend message to be communicated to the WD as a result of receiving the resume request message, the one of the release message and the suspend message configuring a wait timer of the WD.

In some embodiments of this aspect, the one of the release message and the suspend message is one of a Radio Resource Control, RRC, Release message and a RRC Suspend message. In some embodiments of this aspect, the wait timer is a T302 timer. In some embodiments of this aspect, determining the one of the release message and the suspend message to configure the wait timer of the WD further comprises: configuring the wait timer of the WD to stop responsive to receipt of the one of the release message and the suspend message. In some embodiments of this aspect, determining the one of the release message and the suspend message to configure the wait timer of the WD further comprises: configuring the wait timer of the WD to update the wait timer according to a wait value included in the one of the release message and the suspend message. In some embodiments of this aspect, determining the one of the release message and the suspend message to configure the wait timer of the WD further comprises: configuring the wait timer of the WD to stop responsive to identifying an indicator within the one of the release message and the suspend message, the indicator indicating that the wait timer should be stopped if running. In some embodiments of this aspect, determining the one of the release message and the suspend message to configure the wait timer of the WD further comprises: configuring the wait timer of the WD to stop responsive to identifying an absence of an indicator within the one of the release message and the suspend message, the indicator indicating that the wait timer should continue running if already running. In some embodiments of this aspect, determining the one of the release message and the suspend message to configure the wait timer of the WD further comprises: configuring the wait timer of the WD to restart the wait timer responsive to receipt of the one of the release message and the suspend message. In some embodiments of this aspect, the method further comprises, as a result of receiving the resume request message, communicating the one of the release message and the suspend message to the WD.

According to yet another aspect of the present disclosure, a wireless device, WD, configured to communicate with a network node is provided. The WD comprises processing circuitry, the processing circuitry configured to: receive, from the network node, one of a release message and a suspend message; and update a wait timer as a result of receiving the one of the release message and the suspend message.

In some embodiments of this aspect, the wait timer is a T302 timer. In some embodiments of this aspect, the processing circuitry is further configured to update the wait timer as a result of receiving the one of the release message and the suspend message by being configured to: stop the wait timer responsive to receipt of the one of the release message and the suspend message. In some embodiments of this aspect, the processing circuitry is further configured to update the wait timer as a result of receiving the one of the release message and the suspend message by being configured to: update the wait timer according to a wait value identified in the one of the release message and the suspend message. In some embodiments of this aspect, the processing circuitry is further configured to update the wait timer as a result of receiving the one of the release message and the suspend message by being configured to: stop the wait timer responsive to identifying an indicator within the one of the release message and the suspend message, the indicator indicating that the wait timer should be stopped if running. In some embodiments of this aspect, the processing circuitry is further configured to update the wait timer as a result of receiving the one of the release message and the suspend message by being configured to: stop the wait timer responsive to identifying an absence of an indicator within the one of the release message and the suspend message, the indicator indicating that the wait timer should continue running if already running. In some embodiments of this aspect, the processing circuitry is further configured to update the wait timer as a result of receiving the one of the release message and the suspend message by being configured to: restart the wait timer responsive to receipt of the one of the release message and the suspend message. In some embodiments of this aspect, the one of the release message and the suspend message is one of a Radio Resource Control, RRC, Release message and a RRC Suspend message. In some embodiments of this aspect, the processing circuitry is further configured to: communicate, to the network node, a resume request message, wherein the one of the release message and the suspend message is received as a result of communicating the resume request message.

According to another aspect of the present disclosure, a wireless device, WD, configured to communicate with a network node is provided. The WD comprises processing circuitry, the processing circuitry configured to: detect an integrity protection verification error in a lower layer while a wait timer is running; and update the wait timer as a result of the detection of the integrity protection verification error.

In some embodiments of this aspect, the wait timer is a T302 timer. In some embodiments of this aspect, the processing circuitry is further configured to update the wait timer as a result of the detection of the integrity protection verification error by being configured to: stop the wait timer responsive to the detection of the integrity protection verification error. In some embodiments of this aspect, the processing circuitry is further configured to update the wait timer as a result of the detection of the integrity protection verification error by being configured to: restart the wait timer responsive to the detection of the integrity protection verification error. In some embodiments of this aspect, the processing circuitry is further configured to detect the integrity protection verification error in the lower layer while the wait timer is running by being configured to at least one of: detect that a T300X timer expired and detect an integrity check failure while the T300X timer is running.

According to yet another aspect of the present disclosure, a network node configured to communicate with a wireless device, WD, is provided. The network node comprises processing circuitry, the processing circuitry configured to: receive, from the WD, a resume request message; and determine one of a release message and a suspend message to be communicated to the WD as a result of receiving the resume request message, the one of the release message and the suspend message configuring a wait timer of the WD.

In some embodiments of this aspect, the one of the release message and the suspend message is one of a Radio Resource Control, RRC, Release message and a RRC Suspend message. In some embodiments of this aspect, the wait timer is a T302 timer. In some embodiments of this aspect, the processing circuitry is further configured to determine the one of the release message and the suspend message to configure the wait timer of the WD by being configured to: configure the wait timer of the WD to stop responsive to receipt of the one of the release message and the suspend message. In some embodiments of this aspect, the processing circuitry is further configured to determine the one of the release message and the suspend message to configure the wait timer of the WD by being configured to: configure the wait timer of the WD to update the wait timer according to a wait value included in the one of the release message and the suspend message. In some embodiments of this aspect, the processing circuitry is further configured to determine the one of the release message and the suspend message to configure the wait timer of the WD by being configured to: configure the wait timer of the WD to stop responsive to identifying an indicator within the one of the release message and the suspend message, the indicator indicating that the wait timer should be stopped if running. In some embodiments of this aspect, the processing circuitry is further configured to determine the one of the release message and the suspend message to configure the wait timer of the WD by being configured to: configure the wait timer of the WD to stop responsive to identifying an absence of an indicator within the one of the release message and the suspend message, the indicator indicating that the wait timer should continue running if already running. In some embodiments of this aspect, the processing circuitry is further configured to determine the one of the release message and the suspend message to configure the wait timer of the WD by being configured to: configure the wait timer of the WD to restart the wait timer responsive to receipt of the one of the release message and the suspend message. In some embodiments of this aspect, the processing circuitry is further configured to, as a result of receiving the resume request message, communicate the one of the release message and the suspend message to the WD.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 1 illustrates an example WD state machine and state transitions in NR;

FIG. 2 illustrates an RRC connection resume request resulting in a network reject or release;

FIG. 3 illustrates an RRC connection establishment request resulting in a network reject;

FIG. 4 illustrates transitions from RRC_INACTIVE to RRC_INACTIVE in a rejection scenario;

FIG. 5 illustrates RRC connection resume requests resulting in an RRCSuspend or RRCRelease message;

DETAILED DESCRIPTION

Figure 6:
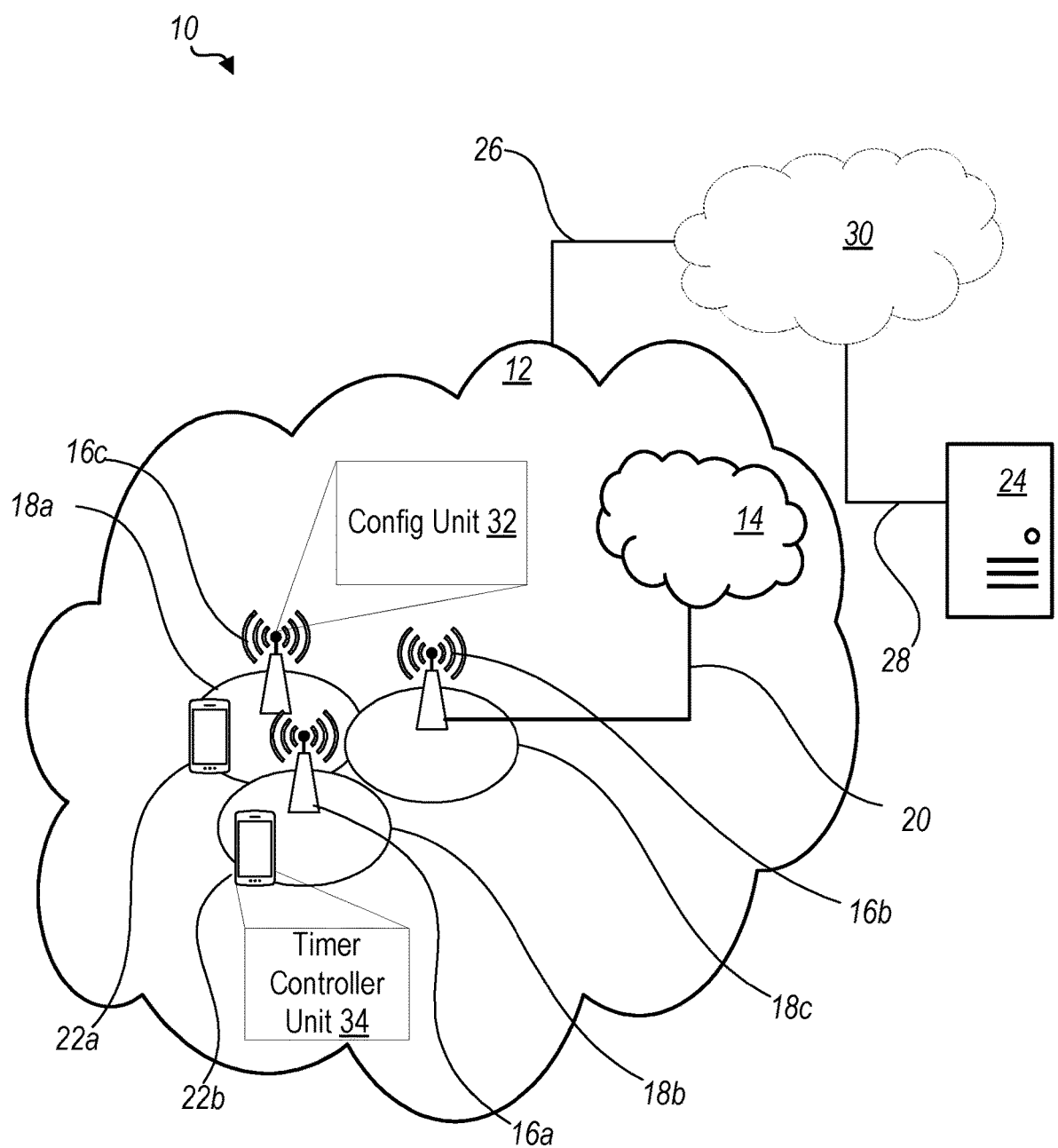
FIG. 6 is a schematic diagram of an exemplary network architecture illustrating a communication system connected via an intermediate network to a host computer according to the principles in the present disclosure.

In NR, timer T302 can be stopped, if running, when the WD enters RRC_CONNECTED i.e., upon receiving an RRCSetup or/and RRCResume message.

Some of the following aspects have been considered for NR RRC, which are different from LTE RRC:

In NR RRC, the network may respond to a ResumeRequest from the WD with a Suspend message which immediately orders the WD back to RRC_INACTIVE state. In LTE, it is not possible to send a suspend message (Release with suspend indication) directly to the WD trying to resume the connection (as shown for example in a comparison of FIG. 3 (LTE) with FIG. 5 (NR)).

In NR RRC, the network may respond to a ResumeRequest from the WD with a Release message that immediately orders the WD back to RRC_IDLE state. Also, this message may be encrypted. In LTE, it is not possible to send a release message (Release) directly to the WD trying to resume the connection (as shown for example in a comparison of FIG. 3 (LTE) with FIG. 5 (NR)).

The scenario described above may be useful for e.g. during RAN area updates, which can be triggered by the expiration of the periodic RNA (Radio Access Network Notification Area) timer. That may also be possible in other scenarios, e.g., in Rel-16, during small/early data transmission. It may be considered in NR, that depending on the handling of barring, the WD may initiate an RRC Resume procedure while wait timer T302 is running.

Hence, due to the differences above, i.e., the new possible responses in NR (Suspend or Release), the timer T302 according to existing procedures will keep running. And, even though the network has already provided a Release message (or suspend), the WD may perform actions upon T302 expiry when not needed.

The consequence is that the network may not be overloaded anymore, although WD may keep running T302 as if the network is overloaded. Hence, if after receiving the Release or Suspend message the WD has some Uplink (UL) data to transmit, the WD could not do that, as T302 would still be running despite the network not being overloaded anymore. In this case, the WD may not be able to access the network.

Another scenario could be that the WD is paged while T302 is running. In this case, the WD may respond to the page assuming page response procedures have high priority and can be performed when T302 is running. If the network at this stage decides to re-suspend or possibly release the WD the T302 will continue to run although this may not be desirable from the network point of view.

Accordingly, some embodiments of the disclosure introduce a new mechanism or triggers at a WD for stopping a wait timer and/or to update the value of the wait timer during RRC inactive procedures. In this way, the WD may not need to unnecessarily execute the procedure when the wait timer times out. The mechanism can be implicit e.g., based on the reception of Release or Suspend message, or the network can explicitly signal the expected WD behavior e.g. reset the timer, stop the timer, continue to run the timer, or set the timer to a different value, etc.

Some advantages of embodiments of the present disclosure may include that by using the new mechanism/triggers stopping (pausing, resetting, changing, continuing, or otherwise updating, etc.) the timer, it may be possible to avoid performing the procedure when the timer times out, which could generate more signaling in the network, consume more WD battery as well as create unnecessary interference. In some of the embodiments, more flexibility to the network may be provided to update the wait timer values according to overload conditions. In this way it may be possible to prioritize emergency or critical communications over other non-critical communications, which could have an important benefit to society, emergency responders, etc. Before describing in detail exemplary embodiments, it is noted that the embodiments reside primarily in combinations of apparatus components and processing steps related to handling a reject wait time. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, integrated access and backhaul (IAB) node, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In some embodiments, methods are described as actions performed by an RRC_INACTIVE WD in NR. While some embodiments are applicable for that case, there can be other additional cases for which embodiments are applicable such as:

All previous cases where procedures occur in LTE instead of NR; that is for the case of LTE RRC_INACTIVE WDs;

Inter-radio access technology (RAT) procedures in the RRC_INACTIVE state, mainly between LTE and NR connected to the same CN (5G Core Network):

the WD in LTE RRC_CONNECTED state is suspended to LTE RRC_INACTIVE state and starts T380, performs mobility and camps on an NR cell (i.e., becomes in NR RRC_INACTIVE state) and tries to resume in NR while T380 is running.

the WD in NR RRC_CONNECTED state is suspended to NR RRC_INACTIVE state and starts T380, performs mobility and camps on an LTE cell (i.e., transits to LTE RRC_INACTIVE state) and tries to resume in LTE while T380 is running.

Embodiments provide apparatuses and methods for the management of a wait timer in a WD 22 when performing RRC connection resume. In some embodiments, by using a new mechanism/trigger for stopping (pausing, resuming, resetting, changing or otherwise updating, etc.) the wait timer it may be possible to avoid performing the procedure when the timer times out, which could generate more signaling in the network, consume more WD 22 battery, as well as, creating unnecessary interference. In some of the embodiments, more flexibility to the network may be provided to update the wait timer values of WDs 22 according to e.g., overload conditions. In this way, it may be possible to prioritize emergency or critical communications over other non-critical communications, which could have an important benefit to society, emergency responders, etc.

Returning to the drawing figures, in which like elements are referred to by like reference numerals, there is shown in FIG. 6 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 6 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to receive, from the WD 22, a resume request message; and determine one of a release message and a suspend message to be communicated to the WD 22 as a result of receiving the resume request message, the one of the release message and the suspend message configuring a wait timer of the WD 22. A wireless device 22 is configured to include a timer controller unit 34 which is configured to receive, from the network node 16, one of a release message and a suspend message; and update a wait timer as a result of receiving the one of the release message and the suspend message. In another embodiment, the wireless device 22 is configured to include a timer controller unit 34 which is configured to detect an integrity protection verification error in a lower layer while a wait timer is running; and update the wait timer as a result of the detection of the integrity protection verification error.

Example implementations, in accordance with an embodiment, of the WD 22, network node 16 and host computer 24 discussed in the preceding paragraphs will now be described with reference to FIG. 7. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a communication unit 54 configured to enable the service provider to observe/monitor/control/transmit to/receive from the network node 16 and/or the wireless device 22.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to receive, from the WD 22, a resume request message; and determine one of a release message and a suspend message to be communicated to the WD 22 as a result of receiving the resume request message, the one of the release message and the suspend message configuring a wait timer of the WD 22.

In some embodiments, the one of the release message and the suspend message is one of: a Radio Resource Control (RRC) release message, a RRC suspend message, and a RRC release message with suspend indication. In some embodiments, the wait timer is a T302 timer. In some embodiments, the processing circuitry 68 is configured to determine the one of the release message and the suspend message to configure the wait timer of the WD 22 to at least one of: stop the wait timer responsive to receipt of the one of the release message and the suspend message; stop the wait timer responsive to identifying an indicator within the one of the release message and the suspend message, the indicator indicating that the wait timer should be stopped if running; stop the wait timer responsive to identifying an absence of an indicator within the one of the release message and the suspend message, the indicator indicating that the wait timer should continue running if already running; update the wait timer according to a wait value identified in the one of the release message and the suspend message; restart the wait timer responsive to receipt of the one of the release message and the suspend message; and update the wait timer as a result of a detection of an integrity protection verification error.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a timer controller unit 34 configured to receive, from the network node 16, one of a release message and a suspend message; and update a wait timer as a result of receiving the one of the release message and the suspend message. In another embodiment, the processing circuitry 84 of the wireless device 22 may include a timer controller unit 34 configured to detect an integrity protection verification error in a lower layer while a wait timer is running; and update the wait timer as a result of the detection of the integrity protection verification error.

In some embodiments, the processing circuitry 84 is further configured to: communicate, to the network node 16, a resume request message, the one of the release message and the suspend message received as a result of communicating the resume request message. In some embodiments, the one of the release message and the suspend message is one of: a Radio Resource Control (RRC) release message, a RRC suspend message, and a RRC release message with suspend indication. In some embodiments, the wait timer is a T302 timer. In some embodiments, the processing circuitry 84 is configured to update the wait timer as a result of receiving the one of the release message and the suspend message by being further configured to at least one of: stop the wait timer responsive to receipt of the one of the release message and the suspend message; stop the wait timer responsive to identifying an indicator within the one of the release message and the suspend message, the indicator indicating that the wait timer should be stopped if running; stop the wait timer responsive to identifying an absence of an indicator within the one of the release message and the suspend message, the indicator indicating that the wait timer should continue running if already running; update the wait timer according to a wait value identified in the one of the release message and the suspend message; and restart the wait timer responsive to receipt of the one of the release message and the suspend message. In some embodiments, the processing circuitry 84 is further configured to: detect an integrity protection verification error in a lower layer while the wait timer is running; and update the wait timer as a result of the detection of the integrity protection verification error.

Figure 7:
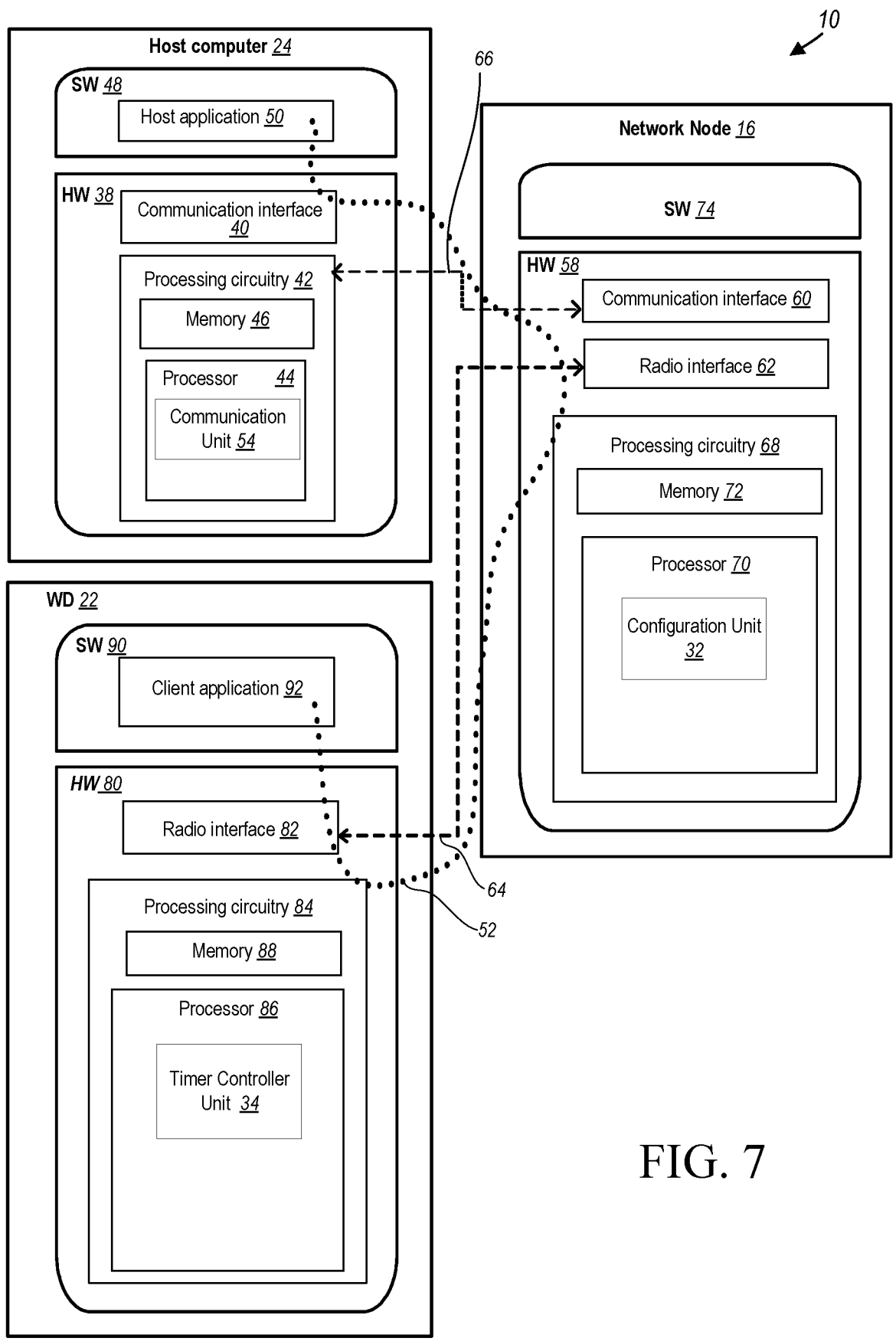
FIG. 7 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 7 and independently, the surrounding network topology may be that of FIG. 6.

In FIG. 7, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 6 and 7 show various "units" such as configuration unit 32, and timer controller unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 8:
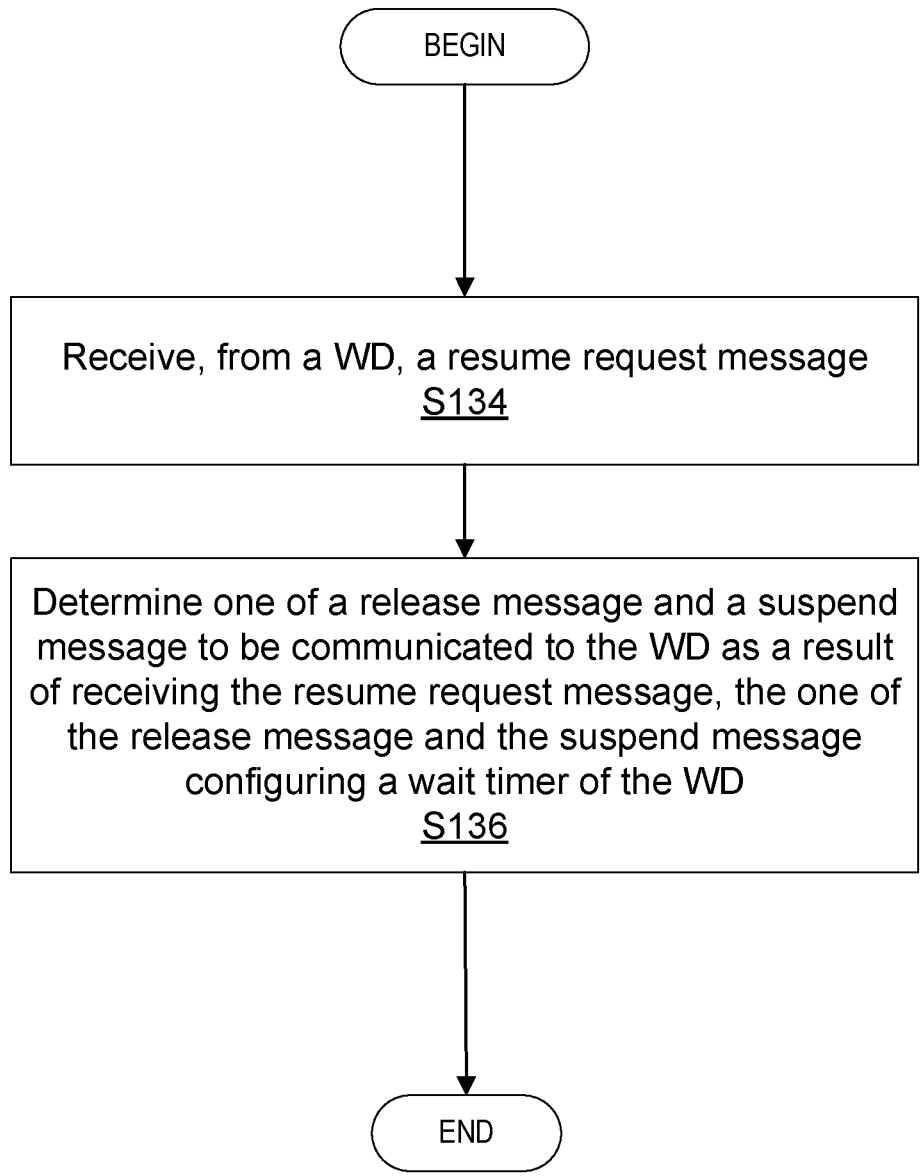
FIG. 8 is a flowchart of an exemplary process in a network node for handling a reject wait time according to some embodiments of the present disclosure.

FIG. 8 is a flowchart of an exemplary process in a network node 16 for handling of reject wait time according to some embodiments of the present disclosure. One or more Blocks and/or functions and/or methods performed by the network node 16 may be performed by one or more elements of network node 16 such as by configuration unit 32 in processing circuitry 68, processor 70, radio interface 62, etc. according to the example method. The method includes receiving (block S134), from a WD 22, such as via configuration unit 32, processing circuitry 68 and/or radio interface 62, a resume request message. The method includes determining (block S136), such as via configuration unit 32, processing circuitry 68 and/or radio interface 62, one of a release message and a suspend message to be communicated to the WD 22 as a result of receiving the resume request message, the one of the release message and the suspend message configuring a wait timer of the WD 22.

In some embodiments, the one of the release message and the suspend message is one of a Radio Resource Control, RRC, Release message and a RRC Suspend message. In some embodiments, the wait timer is a T302 timer. In some embodiments, determining the one of the release message and the suspend message to configure the wait timer of the WD 22 further comprises: configuring, such as via configuration unit 32, processing circuitry 68 and/or radio interface 62, the wait timer of the WD 22 to stop responsive to receipt of the one of the release message and the suspend message. In some embodiments, determining the one of the release message and the suspend message to configure the wait timer of the WD 22 further comprises: configuring, such as via configuration unit 32, processing circuitry 68 and/or radio interface 62, the wait timer of the WD 22 to update the wait timer according to a wait value included in the one of the release message and the suspend message.

In some embodiments, determining the one of the release message and the suspend message to configure the wait timer of the WD 22 further comprises: configuring, such as via configuration unit 32, processing circuitry 68 and/or radio interface 62, the wait timer of the WD 22 to stop responsive to identifying an indicator within the one of the release message and the suspend message, the indicator indicating that the wait timer should be stopped if running. In some embodiments, determining the one of the release message and the suspend message to configure the wait timer of the WD 22 further comprises: configuring, such as via configuration unit 32, processing circuitry 68 and/or radio interface 62, the wait timer of the WD 22 to stop responsive to identifying an absence of an indicator within the one of the release message and the suspend message, the indicator indicating that the wait timer should continue running if already running. In some embodiments, determining the one of the release message and the suspend message to configure the wait timer of the WD 22 further comprises: configuring, such as via configuration unit 32, processing circuitry 68 and/or radio interface 62, the wait timer of the WD to restart the wait timer responsive to receipt of the one of the release message and the suspend message. In some embodiments, the method further comprises, as a result of receiving the resume request message, communicating, such as via configuration unit 32, processing circuitry 68 and/or radio interface 62, the one of the release message and the suspend message to the WD 22.

Figure 9:
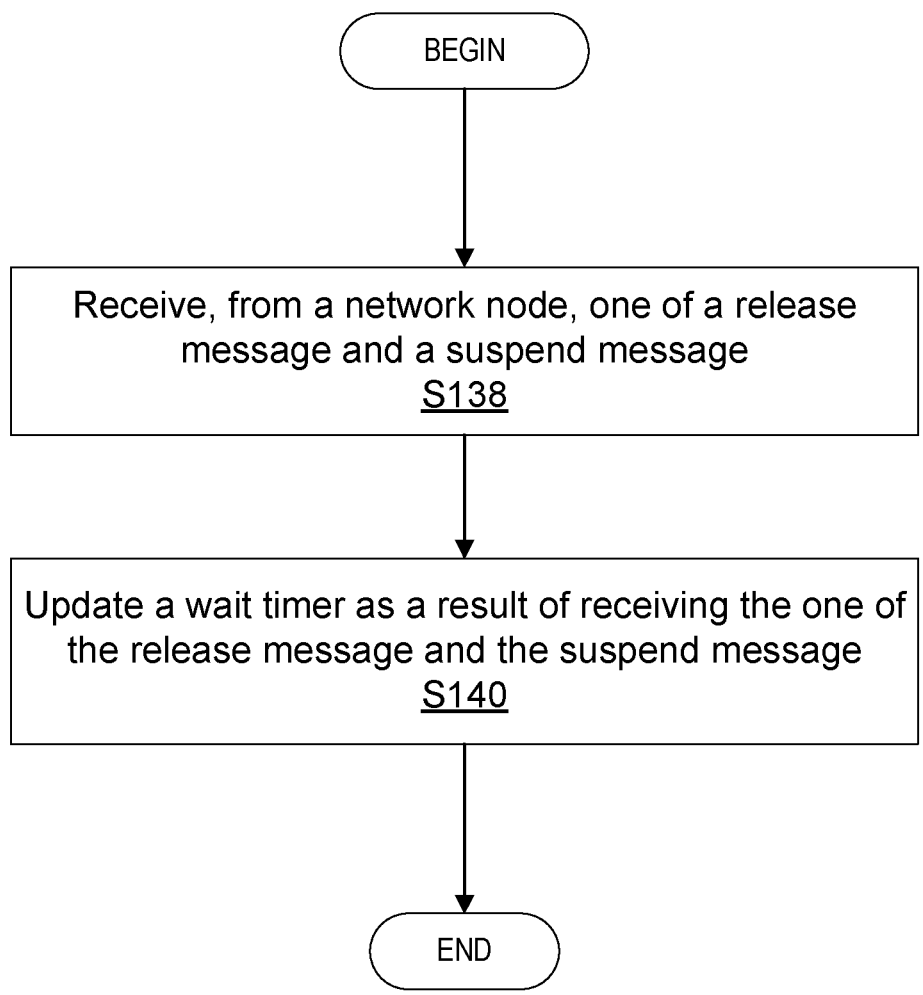
FIG. 9 is a flowchart of an exemplary process in a wireless device for handling a reject wait time according to some embodiments of the present disclosure.

FIG. 9 is a flowchart of an exemplary process in a wireless device 22 according to some embodiments of the present disclosure. One or more Blocks and/or functions and/or methods performed by WD 22 may be performed by one or more elements of WD 22 such as by timer controller unit 34 in processing circuitry 84, processor 86, radio interface 82, etc. The method includes the WD 22 receiving (block S138), from a network node 16, such as via timer controller unit 23, processing circuitry 84, and/or radio interface 82, one of a release message and a suspend message. The method includes updating (block S140), such as via timer controller unit 23, processing circuitry 84, and/or radio interface 82, a wait timer as a result of receiving the one of the release message and the suspend message.

In some embodiments, the wait timer is a T302 timer. In some embodiments, updating the wait timer as a result of receiving the one of the release message and the suspend message further comprises: stopping, such as via timer controller unit 23, processing circuitry 84, and/or radio interface 82, the wait timer responsive to receipt of the one of the release message and the suspend message. In some embodiments, updating the wait timer as a result of receiving the one of the release message and the suspend message further comprises: updating, such as via timer controller unit 23, processing circuitry 84, and/or radio interface 82, the wait timer according to a wait value identified in the one of the release message and the suspend message. In some embodiments, updating the wait timer as a result of receiving the one of the release message and the suspend message further comprises: stopping, such as via timer controller unit 23, processing circuitry 84, and/or radio interface 82, the wait timer responsive to identifying an indicator within the one of the release message and the suspend message, the indicator indicating that the wait timer should be stopped if running.

In some embodiments, updating the wait timer as a result of receiving the one of the release message and the suspend message further comprises: stopping, such as via timer controller unit 23, processing circuitry 84, and/or radio interface 82, the wait timer responsive to identifying an absence of an indicator within the one of the release message and the suspend message, the indicator indicating that the wait timer should continue running if already running. In some embodiments, updating the wait timer as a result of receiving the one of the release message and the suspend message further comprises: restarting, such as via timer controller unit 23, processing circuitry 84, and/or radio interface 82, the wait timer responsive to receipt of the one of the release message and the suspend message. In some embodiments, the one of the release message and the suspend message is one of a Radio Resource Control, RRC, Release message and a RRC Suspend message. In some embodiments, the method further comprises communicating, such as via timer controller unit 23, processing circuitry 84, and/or radio interface 82, to the network node 16, a resume request message, wherein the one of the release message and the suspend message is received as a result of communicating the resume request message.

Figure 10:
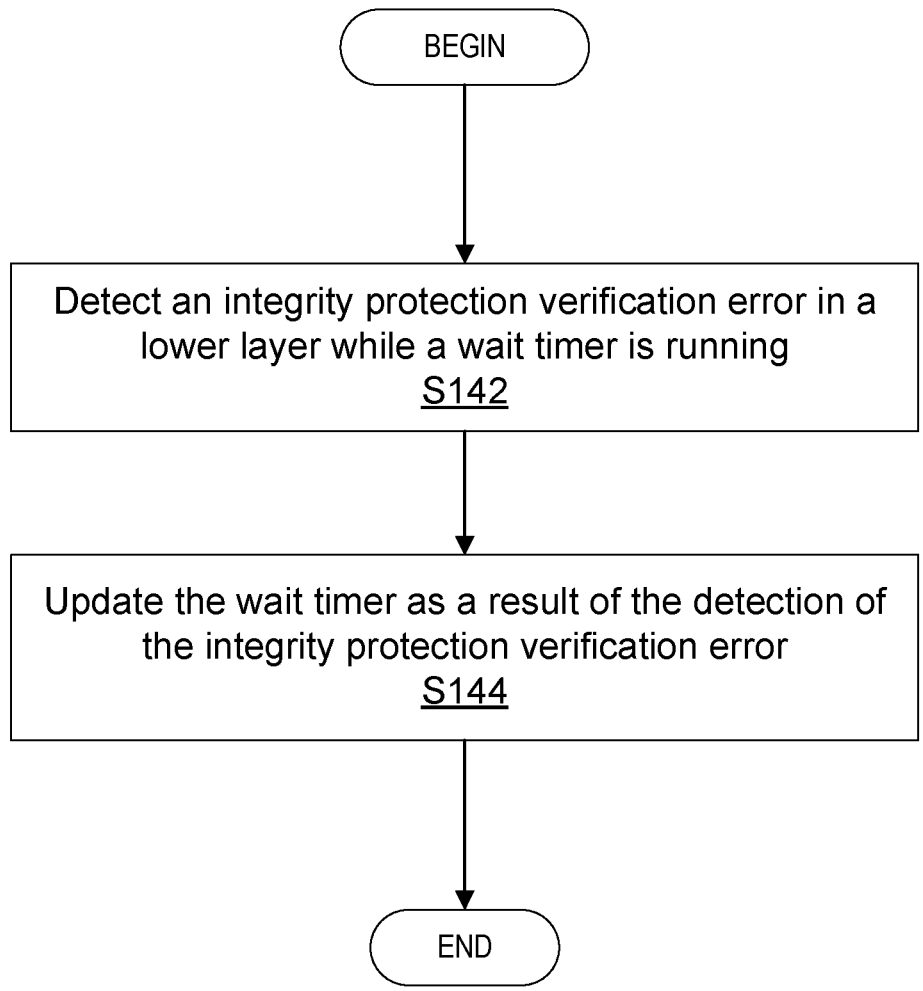
FIG. 10 is a flowchart of yet another exemplary process in a wireless device for updating a wait timer according to some embodiments of the present disclosure.

FIG. 10 is a flowchart of an yet another exemplary process in a wireless device 22 according to some embodiments of the present disclosure. One or more Blocks and/or functions and/or methods performed by WD 22 may be performed by one or more elements of WD 22 such as by timer controller unit 34 in processing circuitry 84, processor 86, radio interface 82, etc. The method includes the WD 22 detecting (block S142), such as via timer controller unit 34, processing circuitry 84 and/or radio interface 82, an integrity protection verification error in a lower layer while a wait timer is running. The method includes updating (block S144), such as via timer controller unit 34, processing circuitry 84 and/or radio interface 82, the wait timer as a result of the detection of the integrity protection verification error.

In some embodiments, the wait timer is a T302 timer. In some embodiments, updating the wait timer as a result of the detection of the integrity protection verification error further comprises: stopping, such as via timer controller unit 34, processing circuitry 84 and/or radio interface 82, the wait timer responsive to the detection of the integrity protection verification error. In some embodiments, updating the wait timer as a result of the detection of the integrity protection verification error further comprises: restarting, such as via timer controller unit 34, processing circuitry 84 and/or radio interface 82, the wait timer responsive to the detection of the integrity protection verification error. In some embodiments, detecting the integrity protection verification error in the lower layer while the wait timer is running further comprises at least one of: detecting, such as via timer controller unit 34, processing circuitry 84 and/or radio interface 82, that a T300X timer expired and detecting an integrity check failure while the T300X timer is running.

Having described some embodiments of the present disclosure, a more detailed description of some of the embodiments follows.

Some embodiments of the present disclosure may be based on introducing new triggers/mechanisms for stopping/updating the wait timer T302. In addition to existing cases when the timer T302 is stopped in LTE (upon entering RRC_CONNECTED, i.e., when the WD 22 receives a Resume message or an RRC Setup message), in some embodiments of the present disclosure the timer is also stopped in the following novel cases when the WD 22 is performing the resume procedure (e.g. when the WD 22 has sent a ResumeRequest message):

When the WD 22 receives the Suspend message;
When the WD 22 receives the Release message; and/or
When the WD 22 has detected an integrity protection verification error in lower layers (e.g., Packet Data Convergence Protocol (PDCP) layer) while timer T302 or T300/T300X (these timers are started when WD 22 sends a Resume request message) is running.

In a first embodiment, WD 22 may stop a wait timer (e.g., timer T302), if running, upon the reception of an RRC Release message (from e.g., network node 16) in response to an RRC Resume Request transmitted (e.g., by the WD 22 to the network node 16) while the wait timer (e.g., T302) is running.

In a second embodiment, WD 22 may stop a wait timer (e.g., T302), if running, upon the reception of an RRC Suspend message (from e.g., network node 16) in response to an RRC Resume Request transmitted (e.g., by the WD 22 to the network node 16) while the wait timer (e.g., T302) is running. In a variant of this second embodiment, WD 22 may stop the wait timer (e.g., T302), if running, upon the reception of an RRC Release message (containing a suspend indication) (from e.g., network node 16) in response to an RRC Resume Request (e.g., by the WD 22 to the network node 16) transmitted while the wait timer (e.g., T302) is running.

In a third embodiment, the WD 22 may stop the timer upon receiving a specified indication in the Suspend or Release message or Release message (with suspend configuration) that the wait timer (e.g., T302) should be stopped if running.

In a fourth embodiment, the WD 22 may stop the timer upon the absence of a specified indication in the Suspend message or Release message or Release message (with suspend configuration) that the wait timer (e.g., T302) should be maintained if running.

In a fifth embodiment, the WD 22 receives (e.g., from network node 16) a value of wait time in a Suspend or Release message (sent in response to a Resume Request message from the WD 22), while the wait timer (e.g., T302) is running, and the WD 22 may perform an updating operation e.g., the WD 22 may apply the new value and start the wait timer (e.g., T302) according to the newly received value.

In a sixth embodiment, the WD 22 may reset or restart the timer (e.g., T302) when receiving a Suspend or Release message (in response to a Resume Request).

In a seventh embodiment, the WD 22 may detect an integrity protection verification error in lower layers (e.g., PDCP layer) while timer (e.g., T302 or T300/T300X) is running and the WD 22 may either stop timer, or restart timer.

The above embodiments above can also be combined in any form in further aspects of the disclosure.

Example Implementations of Some of the Embodiments of the Disclosure

Example Implementation of First and Second Embodiments

In accordance with one example of the first embodiment, as a result of the WD 22 receiving an RRCRelease message (e.g., from the network node 16), the WD 22 may perform the following:
  (a) discard any stored WD 22 AS context and I-RNTI;
  (b) stop the timer T302 if the timer is running;
  (c) delay the following actions defined in this sub-clause X ms (the value of X may be configurable or may be fixed to e.g., 60 ms) from the moment the RRCRelease message was received or optionally when lower layers indicate that the receipt of the RRCRelease message has been successfully acknowledged, whichever is earlier.

In accordance with one example of the second embodiment, as a result of the WD 22 receiving an RRCSuspend message (e.g., from the network node 16), the WD 22 may perform the following:
  (a) delay the following actions defined in this sub-clause for X ms (the value of X may be configurable or may be fixed to e.g., 60 ms) from the moment the RRCSuspend message was received or optionally when lower layers indicate that the receipt of the RRCSuspend message has been successfully acknowledged, whichever is earlier;
  (b) stop the timer T302 if the timer is running;
  (c) if the RRCSuspend message includes the idleMode-MobilityControlInfo:
    (i) store the cell reselection priority information provided by the idleModeMobilityControlInfo;
    (ii) if the t320 is included:start timer T320, with the timer value set according to the value of t320;
  (d) else: apply the cell reselection priority information broadcast in the system information;
  (e) store the following information provided by the network: resumeIdentity, nextHopChainingCount, ran-PagingCycle and ran-NotificationAreaInfo;
  (f) re-establish Radio Link Control (RLC) entities for all Signalling Radio Bearers (SRBs) and Data Radio Bearers (DRBs);
  (g) except if the RRCSuspend message was received in response to an RRCResumeRequest: store the WD 22 AS Context including the current RRC configuration, the current security context, the PDCP state including Robust Header Compression (ROHC) state, C-RNTI used in the source Primary Cell (PCell), the cellIdentity and the physical cell identity of the source PCell;
  (h) suspend all SRB(s) and DRB(s), except SRB0;
  (i) start timer T380, with the timer value set to periodic-RNAU-timer;
  (j) indicate the suspension of the RRC connection to upper layers;
  (k) configure lower layers to suspend integrity protection and ciphering; and
  (l) enter RRC_INACTIVE and perform procedures as specified in TS 38.304.

The following is an example table, Table 2, illustrating an example timer according to an embodiment of the present disclosure. In particular, Table 2 indicates what may start the timer, what may stop the timer and what can occur at the expiration of the timer, as follows:

TABLE 2

| Timer | Start | Stop | At expiry |
|---|---|---|---|
| T302 | Reception of RRCReject while performing RRC connection establishment or resume. | Upon entering RRC_CONNECTED, upon receiving RRCRelease or RRCSuspend and upon cell re-selection. | Inform upper layers about barring alleviation as specified in 5.3.x. |

Example Implementation of Third Embodiment

According to one example of the third embodiment, the WD 22 may stop the wait timer upon receiving a specified indication in the Suspend or Release message or Release message (with suspend configuration) that the wait timer T302 shall be stopped if running. Otherwise, if the indication is not present, the WD 22 does not stop the timer. According to such example, as a result of the WD 22 receiving an RRCSuspend message (e.g., from the network node 16), the WD 22 may perform the following:
  a) delay the following actions defined in this sub-clause X ms (the value of X may be configurable or may be fixed to e.g., 60 ms) from the moment the RRCSuspend message was received or optionally when lower layers indicate that the receipt of the RRCSuspend message has been successfully acknowledged, whichever is earlier
  b) if the RRCSuspend message includes an indication to stop the timer T302, stop the timer T302 if running;
  c) if the RRCSuspend message includes the idleMode-MobilityControlInfo:
    (1) store the cell reselection priority information provided by the idleModeMobilityControlInfo;
    (2) if the t320 is included: start timer T320, with the timer value set according to the value of t320;

d) else:
   (1) apply the cell reselection priority information broadcast in the system information;
e) store the following information provided by the network: resumeIdentity, nextHopChainingCount, ran-PagingCycle and ran-NotificationAreaInfo;
f) re-establish RLC entities for all SRBs and DRBs;
g) except if the RRCSuspend message was received in response to an RRCResumeRequest:
   (1) store the WD 22 AS Context including the current RRC configuration, the current security context, the PDCP state including ROHC state, C-RNTI used in the source PCell, the cellIdentity and the physical cell identity of the source PCell;
h) suspend all SRB(s) and DRB(s), except SRB0;
i) start timer T380, with the timer value set to periodic-RNAU-timer;
j) indicate the suspension of the RRC connection to upper layers;
k) configure lower layers to suspend integrity protection and ciphering;
l) enter RRC_INACTIVE and perform procedures as specified in TS 38.304

According to another example of the third embodiment, as a result of the WD 22 receiving an RRCRelease message (e.g., from the network node 16), the WD 22 may perform the following:
a) discard any stored WD 22 AS context and I-RNTI;
b) if the RRCRelease message includes an indication to stop the timer T302, stop the timer T302 if running;
c) delay the following actions defined in this sub-clause X ms (the value of X may be configurable or may be fixed to e.g., 60 ms) from the moment the RRCRelease message was received or optionally when lower layers indicate that the receipt of the RRCRelease message has been successfully acknowledged, whichever is earlier;

Example Implementation of Fourth Embodiment

According to one example of the fourth embodiment, the WD 22 may stop the timer upon the absence of a specified indication in the Suspend message or Release message or Release message (with suspend configuration) that the wait timer T302 shall be stopped if running. According to this example, as a result of the WD 22 receiving (e.g., from the network node 16) a RRCSuspend, the WD 22 may perform the following:
a) delay the following actions defined in this sub-clause X ms (the value of X may be configurable or may be fixed to e.g., 60 ms) from the moment the RRCSuspend message was received or optionally when lower layers indicate that the receipt of the RRCSuspend message has been successfully acknowledged, whichever is earlier;
b) if the RRCSuspend message does not include includes an indication to maintain the timer T302, stop the timer T302 if running;
c) if the RRCSuspend message includes the idleMode-MobilityControlInfo:
   (1) store the cell reselection priority information provided by the idleModeMobilityControlInfo;
   (2) if the t320 is included:start timer T320, with the timer value set according to the value of t320;
d) else:
   (1) apply the cell reselection priority information broadcast in the system information;
e) store the following information provided by the network: resumeIdentity, nextHopChainingCount, ran-PagingCycle and ran-NotificationAreaInfo;
f) re-establish RLC entities for all SRBs and DRBs;
g) except if the RRCSuspend message was received in response to an RRCResumeRequest:
   (1) store the WD 22 AS Context including the current RRC configuration, the current security context, the PDCP state including ROHC state, C-RNTI used in the source PCell, the cellIdentity and the physical cell identity of the source PCell;
h) suspend all SRB(s) and DRB(s), except SRB0;
i) start timer T380, with the timer value set to periodic-RNAU-timer;
j) indicate the suspension of the RRC connection to upper layers;
k) configure lower layers to suspend integrity protection and ciphering;
l) enter RRC_INACTIVE and perform procedures as specified in TS 38.304.

According to another example of the fourth embodiment, as a result of the WD 22 receiving (e.g., from the network node 16) a RRCRelease, the WD 22 may perform the following:
a) discard any stored WD 22 AS context and I-RNTI;
b) if the RRCRelease message includes an indication to maintain the timer T302, stop the timer T302 if running;
c) delay the following actions defined in this sub-clause X ms (the value of X may be configurable or may be fixed to e.g., 60 ms) from the moment the RRCRelease message was received or optionally when lower layers indicate that the receipt of the RRCRelease message has been successfully acknowledged, whichever is earlier;

Example Implementation of Fifth Embodiment

According to one example of a fifth embodiment, the WD 22 receives a value of a wait time in a Suspend or Release message (e.g., from the network node 16) (in response to a Resume Request), while the wait timer T302 is running, and performs an updating operation i.e., the WD 22 applies the new value and starts the wait timer T302 according to the newly received value. In accordance with this example, as a result of the WD 22 receiving (e.g., from the network node 16) a RRCSuspend, the WD 22 may perform the following:
a) delay the following actions defined in this sub-clause X ms (the value of X may be configurable or may be fixed to e.g., 60 ms) from the moment the RRCSuspend message was received or optionally when lower layers indicate that the receipt of the RRCSuspend message has been successfully acknowledged, whichever is earlier
b) if the RRCSuspend message does includes a wait time;
   (1) set timer T302 to the value of the wait time;
   (2) start timer T302;
c) if the RRCSuspend message includes the idleMode-MobilityControlInfo:
   (1) store the cell reselection priority information provided by the idleModeMobilityControlInfo;
   (2) if the t320 is included: start timer T320, with the timer value set according to the value of t320;
d) else:
   (1) apply the cell reselection priority information broadcast in the system information;

e) store the following information provided by the network: resumeIdentity, nextHopChainingCount, ran-PagingCycle and ran-NotificationAreaInfo;
f) re-establish RLC entities for all SRBs and DRBs;
g) except if the RRCSuspend message was received in response to an RRCResumeRequest:
 (1) store the WD 22 AS Context including the current RRC configuration, the current security context, the PDCP state including ROHC state, C-RNTI used in the source PCell, the cellIdentity and the physical cell identity of the source PCell;
h) suspend all SRB(s) and DRB(s), except SRB0;
i) start timer T380, with the timer value set to periodic-RNAU-timer;
j) indicate the suspension of the RRC connection to upper layers;
k) configure lower layers to suspend integrity protection and ciphering;
l) enter RRC_INACTIVE and perform procedures as specified in TS 38.304 [21].

According to another example of the fifth embodiment, as a result of the WD 22 receiving (e.g., from network node 16) a RRCRelease, the WD 22 may perform the following:
a) discard any stored WD 22 AS context and I-RNTI;
b) if the RRCRelease message does includes a wait time;
 (1) set timer T302 to the value of the wait time;
 (2) start timer T302;
c) delay the following actions defined in this sub-clause X ms from the moment the RRCRelease message was received or optionally when lower layers indicate that the receipt of the RRCRelease message has been successfully acknowledged, whichever is earlier;

Example Implementation of Sixth Embodiment

According to one example of a sixth embodiment, the WD 22 resets or restart the timer T302 when receiving a Suspend or Release message (e.g., form a network node 16) (in response to a Resume Request). In an example, as a result of the WD 22 receiving a RRCSuspend message, the WD 22 may perform the following:
a) delay the following actions defined in this sub-clause X ms from the moment the RRCSuspend message was received or optionally when lower layers indicate that the receipt of the RRCSuspend message has been successfully acknowledged, whichever is earlier;
b) restart timer T302 if running;
c) if the RRCSuspend message includes the idleModeMobilityControlInfo:
 store the cell reselection priority information provided by the idleModeMobilityControlInfo;
 (1) if the t320 is included: start timer T320, with the timer value set according to the value of t320;
d) else:
 (1) apply the cell reselection priority information broadcast in the system information;
e) store the following information provided by the network: resumeIdentity, nextHopChainingCount, ran-PagingCycle and ran-NotificationAreaInfo;
f) re-establish RLC entities for all SRBs and DRBs;
g) except if the RRCSuspend message was received in response to an RRCResumeRequest:
 (1) store the WD 22 AS Context including the current RRC configuration, the current security context, the PDCP state including ROHC state, C-RNTI used in the source PCell, the cellIdentity and the physical cell identity of the source PCell;
h) suspend all SRB(s) and DRB(s), except SRB0;
i) start timer T380, with the timer value set to periodic-RNAU-timer;
j) indicate the suspension of the RRC connection to upper layers;
k) configure lower layers to suspend integrity protection and ciphering;
l) enter RRC_INACTIVE and perform procedures as specified in TS 38.304.

In another example of the sixth embodiment, as a result of the WD 22 receiving a RRCRelease message, the WD 22 may perform the following:
a) discard any stored WD 22 AS context and I-RNTI;
b) restart T302 if running; and
c) delay the following actions defined in this sub-clause X ms from the moment the RRCRelease message was received or optionally when lower layers indicate that the receipt of the RRCRelease message has been successfully acknowledged, whichever is earlier.

Example Implementation of Seventh Embodiment

In one example of a seventh embodiment, the WD 22 detects an integrity protection verification error in lower layers (e.g., PDCP layer) while timer T302 or T300/T300X is running and either stops time T302 or restarts timer T302. According to one example, the WD 22 may detect that a T300X timer has expired or may detect an integrity check failure from lower layers while T300X is running. As a result, the WD 22 may perform the following:
a) stop T302 if running; and
b) if timer T300X expires or upon receiving Integrity check failure indication: perform the actions upon going to RRC_IDLE as specified in 5.3.11 with release cause RRC Resume failure.

In some embodiments, configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending RRC messages to the terminal indicating parameters for, e.g., a wait timer according to embodiments of the present disclosure.

Configuring a Radio Node

Configuring a radio node, in particular a terminal or user equipment or the WD 22, may refer to the radio node being adapted or caused or set and/or instructed to operate according to the configuration. Configuring may be done by another device, e.g., a network node 16 (for example, a radio node of the network like a base station or eNodeB) or network, in which case it may comprise transmitting configuration data to the radio node to be configured. A radio node may configure itself, e.g., based on configuration data received from a network or network node 16. A network node 16 may use, and/or be adapted to use, its circuitry/ies for configuring. Configuration data may comprise and/or be represented by configuration information, and/or one or more corresponding indications and/or message/s.

Configuring in General

Generally, configuring may include determining configuration data representing the configuration and providing, e.g. transmitting, it to one or more other nodes (parallel and/or sequentially), which may transmit it further to the radio node (or another node, which may be repeated until it reaches the wireless device 22). Alternatively, or additionally, configuring a radio node, e.g., by a network node 16 or other device, may include receiving configuration data and/or data pertaining to configuration data, e.g., from another node like a network node 16, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD 22) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD 22) may comprise configuring the WD 22 to update a wait timer according to embodiments of the present disclosure.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a wireless device (WD) the method comprising:
    receiving a reject message from a network node while performing one of a connection establishment procedure and a connection resume procedure;
    starting a wait timer associated with the receiving of the reject message;
    receiving, from the network node, one of a release message and a suspend message; and
    updating the wait timer while the wait timer is running as a result of receiving the one of the release message and the suspend message, the updating including restarting the wait timer responsive to receipt of the one of the release message and the suspend message.

2. The method of claim 1, wherein the wait timer is a T302 timer.

3. The method of claim 1, further comprising:
    communicating, to the network node, a resume request message, wherein the one of the release message and the suspend message is received as a result of communicating the resume request message.

4. A method in a network node configured to communicate with a wireless device (WD) the method comprising:
    communicating a reject message to the WD while performing one of a connection establishment procedure and a connection resume procedure with the WD, the reject message configuring a wait timer of the WD to start;
    receiving, from the WD, a resume request message; and
    determining one of a release message and a suspend message to be communicated to the WD as a result of receiving the resume request message, the one of the release message and the suspend message configuring the wait timer of the WD to restart the wait timer while the wait timer is running responsive to receipt of the one of the release message and the suspend message.

5. The method of claim 4, wherein the wait timer is a T302 timer.

6. The method of claim 4, further comprising:
    as a result of receiving the resume request message, communicating the one of the release message and the suspend message to the WD.

7. A wireless device (WD) configured to communicate with a network node, the WD comprising processing circuitry, the processing circuitry configured to:
    receive a reject message from a network node while performing one of a connection establishment procedure and a connection resume procedure;
    start a wait timer associated with the receiving of the reject message;
    receive, from the network node, one of a release message and a suspend message; and
    update the wait timer while the wait timer is running as a result of receiving the one of the release message and the suspend message, the updating including restarting the wait timer responsive to receipt of the one of the release message and the suspend message.

8. The WD of claim 7, wherein the wait timer is a T302 timer.

9. A network node configured to communicate with a wireless device (WD) the network node comprising processing circuitry, the processing circuitry configured to:
- communicate a reject message to the WD while performing one of a connection establishment procedure and a connection resume procedure with the WD, the reject message configuring a wait timer of the WD to start;
- receive, from the WD, a resume request message; and
- determine one of a release message and a suspend message to be communicated to the WD as a result of receiving the resume request message, the one of the release message and the suspend message configuring the wait timer of the WD to restart the wait timer while the wait timer is running responsive to receipt of the one of the release message and the suspend message.

\* \* \* \* \*